June 6, 1939.  J. T. WILSON  2,161,649
CARD SELECTING MACHINE
Original Filed July 3, 1937  6 Sheets-Sheet 2

INVENTOR.
Joseph T. Wilson
BY
ATTORNEYS.

June 6, 1939.  J. T. WILSON  2,161,649
CARD SELECTING MACHINE
Original Filed July 3, 1937   6 Sheets—Sheet 3
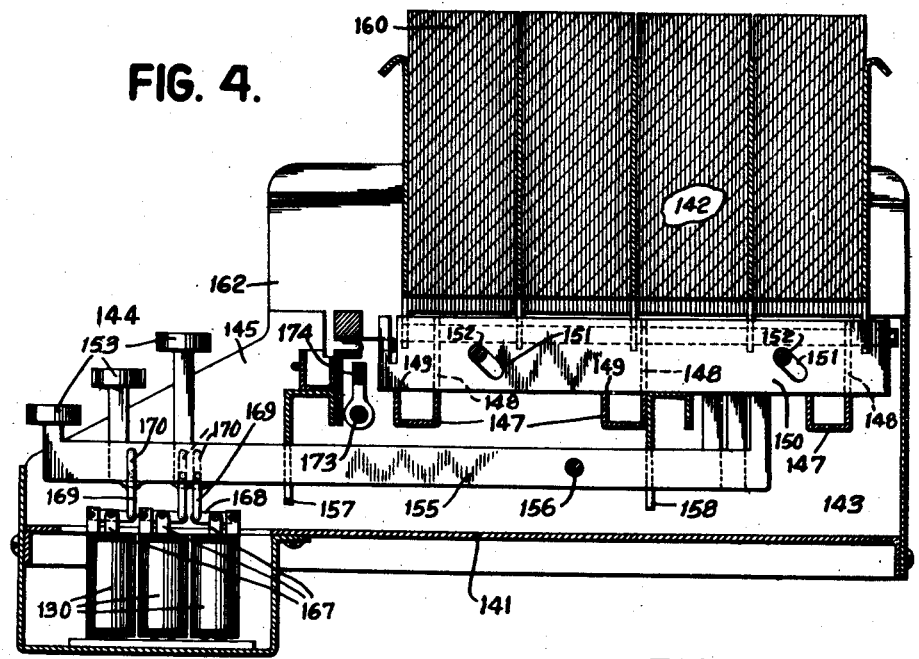

June 6, 1939.   J. T. WILSON   2,161,649
CARD SELECTING MACHINE
Original Filed July 3, 1937   6 Sheets-Sheet 4

INVENTOR.
Joseph T. Wilson
BY
ATTORNEYS.

June 6, 1939.   J. T. WILSON   2,161,649
CARD SELECTING MACHINE
Original Filed July 3, 1937   6 Sheets-Sheet 5

INVENTOR.
Joseph T. Wilson
BY
ATTORNEYS.

June 6, 1939.        J. T. WILSON        2,161,649
CARD SELECTING MACHINE
Original Filed July 3, 1937      6 Sheets-Sheet 6

Patented June 6, 1939

2,161,649

UNITED STATES PATENT OFFICE 2,161,649

CARD SELECTING MACHINE

Joseph T. Wilson, Pitman, N. J., assignor to International Business Machines Corporation, New York, N. Y., a corporation of New York Original application July 3, 1937, Serial No. 151,861. Divided and this application October 27, 1937, Serial No. 171,190

7 Claims. (Cl. 101—2)

This application is a divisional case of an application filed July 3, 1937, Serial No. 151,861.

This invention relates to tabulating machines and more particularly to the type in which cards representing group control numbers control operations of the machine and which is provided with a printing mechanism for printing the items relating to an account.

Tabulating machines are, as is well known, controlled by tabulating cards carrying designations representing the items of an account and each account is identified by group control number designations. It is further desirable to print on a related ledger card the items of the account and to this end it has, heretofore, been proposed to pass the tabulating cards through the machine in successive groups and for each group pass a classified ledger card, as is disclosed in the patent to F. M. Carroll No. 1,978,893, dated October 30, 1934. The requisites of the construction disclosed in this patent is that the ledger cards should be sorted so as to be in the same order as the groups of tabulating cards. These ledger cards are usually of dimensions different than the tabulating cards so that since a conventional sorting mechanism cannot be used a manual sorting operation, which is a prodigious task, is necessary. Since the correlation may not follow by reason of errors, a complicated comparing mechanism must be provided to ascertain whether the number of the ledger card fed corresponds to the group control number of the tabulating cards bearing the items which are to be printed on the ledger card.

The present construction obviates the requisites pointed out above and contemplates as the main object of the invention the provision of a card filing machine with a selecting mechanism therefor and which is controlled by the tabulating machine. The passage of a card representing a new group control number causes the automatic selection of a ledger card which is correlated with the group control number of the tabulating cards.

A still further object of the invention is to cause the shift of the selected ledger card out of normal relation with the other ledger cards in the file so that such shifted position indicates that it is the selected ledger card, and which can be pulled manually from the file and presented to the printing mechanism of the tabulating machine.

A still further object of the invention is to provide a separate and independently controlled ledger card selecting machine which may be operated in accordance with its usual manual control, or which manual control may be placed under automatic control of the tabulating machine.

In said drawings:

Fig. 4 is a longitudinal sectional view of the ledger card filing and selecting machine.

Fig. 5 is a cross sectional view of the ledger card filing and selecting machine.

Figure 8:
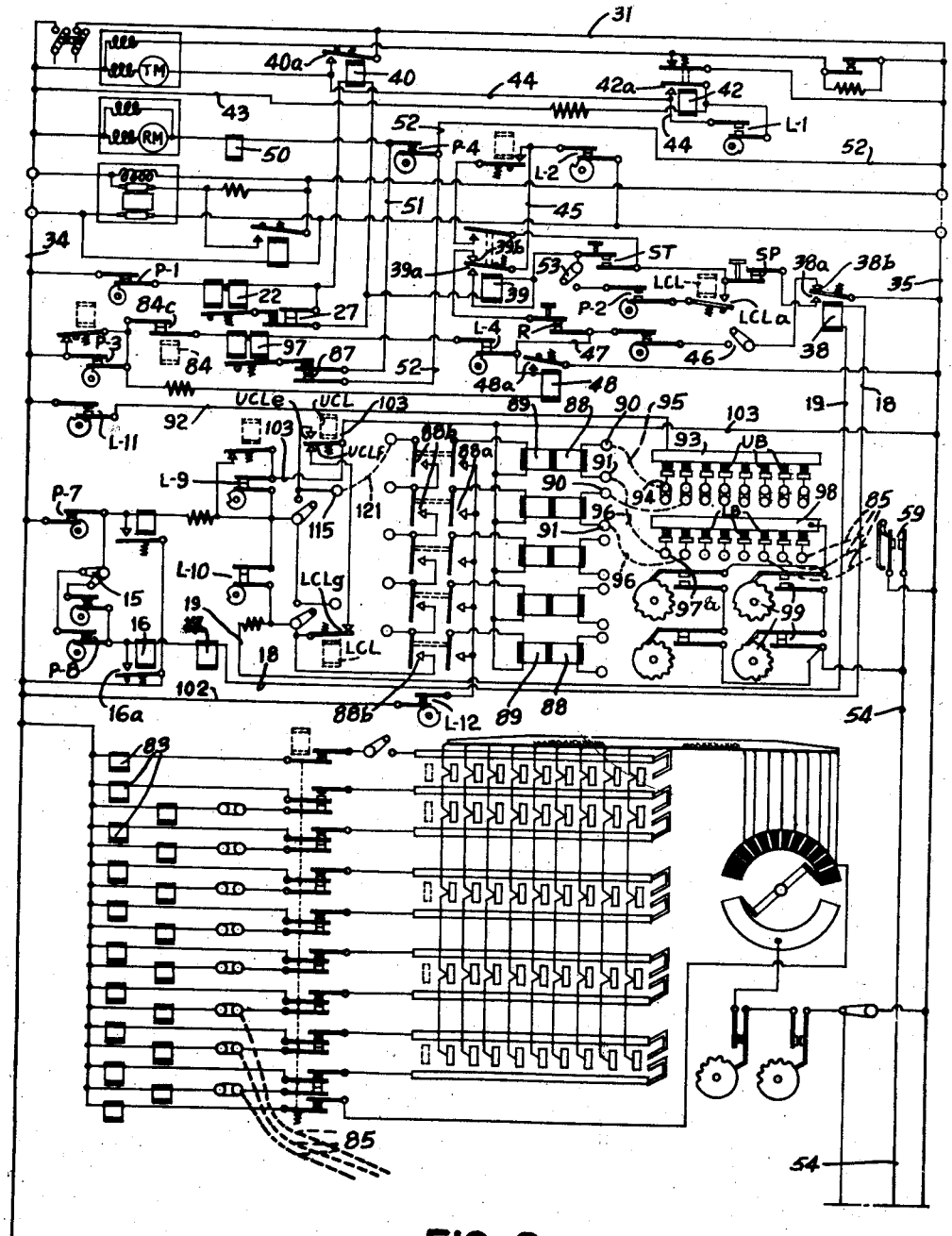
Figure 9:
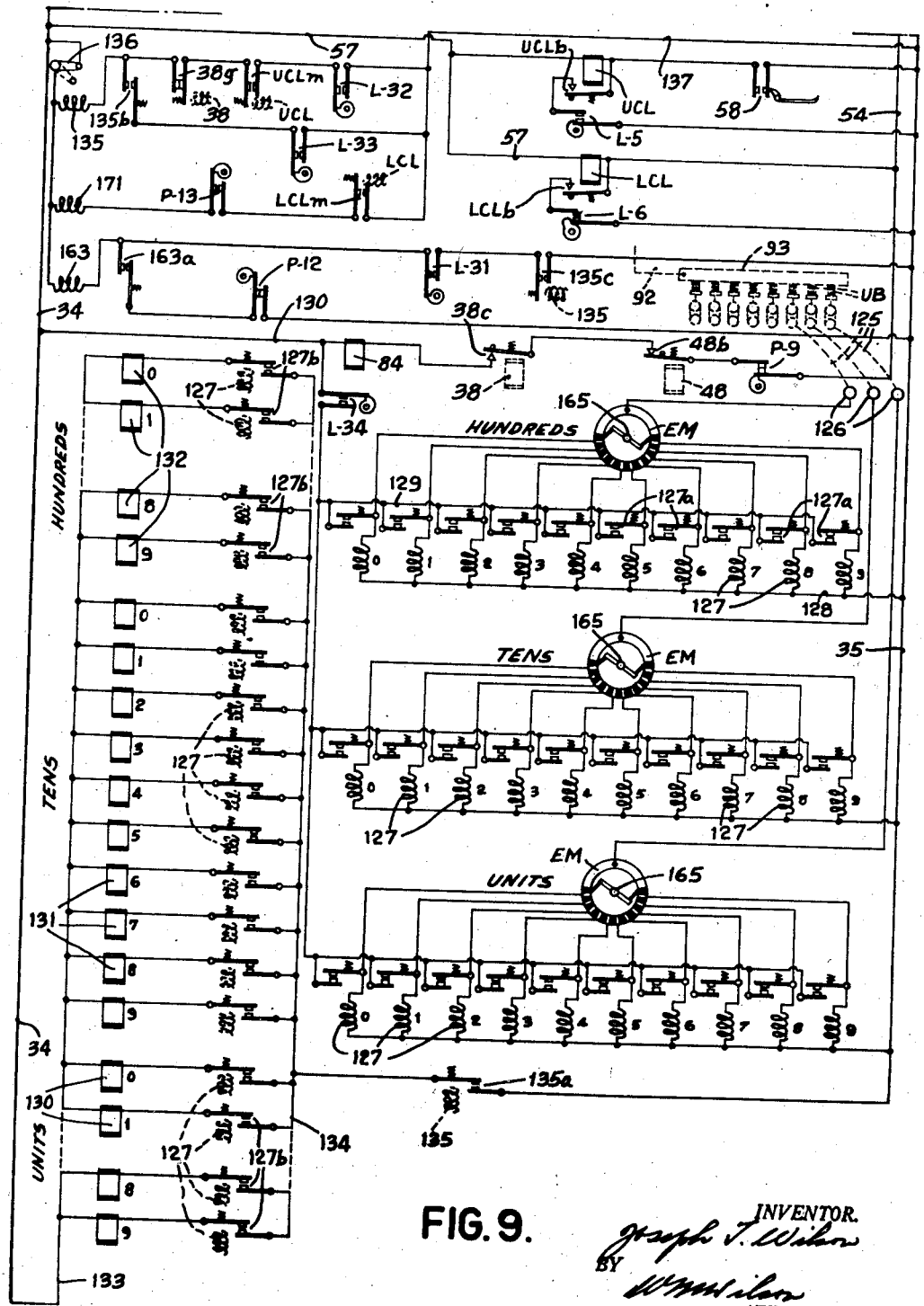

Figs. 8 and 9 taken together with Fig. 8 at the top illustrate the electrical wiring diagram of both the tabulating and ledger card selecting machines.

For further explanation of details of construction and operation of the tabulating machine to which the present improvements are applied, reference should be had to the patent to C. D. Lake et al. No. 1,976,617, dated October 9, 1934.

In tabulating machines of this class, as more particularly explained in the aforementioned patent, it is customary to send the machine through a reset cycle of operation to set up the automatic group control mechanism forming part of the present invention. Suffice it to say at the present time that during the resetting operation motor control magnet 38 (Fig. 8) is energized and a holding circuit is provided for maintaining it energized until the group control number of the cards being analyzed changes. Contacts 38a of this relay will, therefore, be closed and contacts 38b open.

*Starting circuit.*—The machine is now ready to start card feeding operations after cards have been placed in the feed magazine usually provided for in tabulating machines. Depression of the start key to close contacts ST will complete a circuit as follows: from line 34, cam contacts P—1, tabulating clutch magnet 22, contacts 27, start relay 39, start key contacts ST, stop key contacts SP, contacts 38a (now closed), to line 35. Energization of magnet 22 will cause opening of contacts 27 and the circuit will now include relay magnet 40 which is wired in parallel with the contacts 27. Magnet 40 will close its contacts 40a to complete a circuit through the tabulating motor as follows: from line 34, motor TM, contacts 40a, wire 31, to line 35, thus initiating the operation of the motor. After the motor has operated through a portion of the cycle, cam contacts L—1 close momentarily and complete a circuit from the line 34, wire 43, relay magnet 42, contacts L—1, wire 44, contacts 40a and wire 31 to line 35.

The consequent closure of contacts 42a will set up a holding circuit for the magnet 42, traceable from line 34, wire 43, magnet 42, contacts 42a, wire 44, contacts 40a, wire 31 to line 35. Energization of the start relay magnet 39 will effect closure of its contacts 39a to set up a holding circuit for the card feed clutch magnet 22 traceable from the line 34, cam contacts P—1, magnet 22, relay 40, magnet 39, contacts 39a, wire 45, cam contacts L—2, to line 35. Toward the end of this cycle, cam contacts L—2, break and the machine will coast through the remainder of the cycle to home position, which is, as commonly known in the art, termed the "D" position. A second machine cycle is now initiated by depression of the start key to close contacts ST and a second cycle will follow in the same manner as the first. During this second cycle, the first card is advanced to the lower brushes and a second card is fed from the supply magazine to the upper brushes. Following this second cycle, the machine will, as fully described in the aforementioned patent, do one of two things: if the automatic resetting switch 46 is open, the machine will stop; if the automatic resetting switch 46 is closed, the machine will automatically enter upon a resetting cycle of operation.

It has thus been explained that the initiation of operations of the machine require first a resetting operation followed by two successive, manually initiated, tabulating cycles followed by a resetting cycle which may be automatically initiated. At this point, the first card is in readiness to pass and be analyzed by the lower brushes LB and the second card is in readiness to pass and be analyzed by the upper brushes UB and the automatic control mechanism is in readiness to compare the classification data of the cards as they pass through the machine.

Following the reset cycle just explained, the machine will, if automatic start switch 53 is closed, automatically enter upon card feeding and analyzing operations immediately upon completion of the last resetting cycle. This is brought about in the following manner: Lower card lever relay contacts LCLa, by a circuit to be presently explained, have been closed due to the arrival of the first card at the lower brushes LB and during the reset cycle cam contacts P—2 close momentarily at the end of the cycle thereby establishing a circuit from the line 35, contacts 38a, contacts SP, LCLa and P2, switch 53, start relay magnet 39, contact 27, tabulating clutch magnet 22, contacts P1, to line 34. The energization of magnet 22 will, as explained above, cause the machine to enter upon a tabulating cycle of operation during which the record cards are successively analyzed and data thereon printed by the printing mechanism. Closure of lower card lever contacts 59 completes a circuit from line 35, contacts 59, wire 54 leading (as shown in Fig. 9) to relay magnet LCL, wire 57, to line 34 to effect closure of contacts LCLb and the closure of contacts LCLa (Fig. 8) mentioned above. Closure of contacts LCLb will complete a holding circuit for relay LCL through cam contacts L—6. This circuit is from line 35, contacts L—6, contacts LCLb, magnet LCL, wire 57, to line 34. As long as record cards continue to pass the lower brushes LB magnet LCL will remain continuously energized since contacts L—6 are timed to be closed during the interval that the card lever contacts 59 open.

The upper card lever contacts 58 (Fig. 9 at the top and extreme right) similarly complete a circuit from the line 35, contacts 58, magnet UCL, wire 57, to line 34. Closure of contacts UCL sets up a holding circuit through cam contacts L—5 whose function and timing are the same as that of contacts L—6.

In certain forms of accounting practice it is desirable to determine when group control numbers change so that a ledger card 160 (Fig. 5) can be selected out of a file and presented to the printing mechanism to receive the items pertaining to the group which has the same group number as the file number of the ledger card. Prior to explaining the mechanism for causing the selection of the ledger cards there will be explained the operation of the printing mechanism which prints the items on the ledger cards.

As is well known printing upon the ledger card is performed by a printing mechanism under control of the brushes LB which are suitably plugged to control the printer control magnets.

Figure 2:
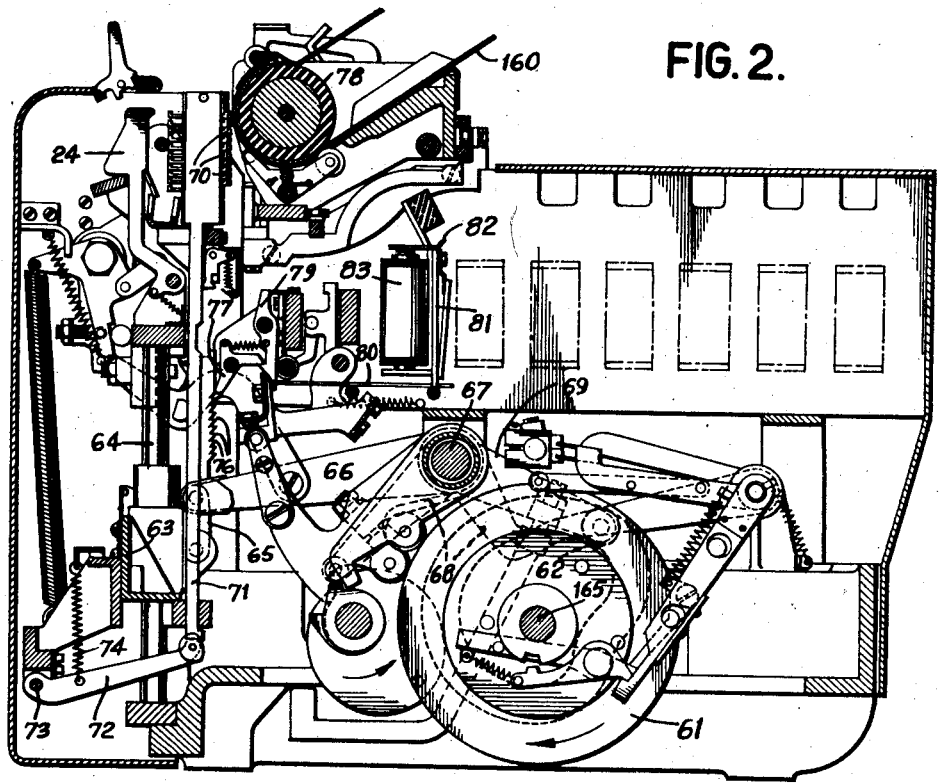
Fig. 2 is a view in section showing a well known form of printing mechanism adapted for use in a tabulating machine.

*Printing mechanism.*—The printing mechanism employed in carrying out the present invention is of a type well known in the art and is shown in Fig. 2. Sufficient explanation will be given herein in order to understand in a general way the manner of the operation of the printing mechanism, but for further details, reference to the aforementioned patent should be had.

Figure 1:
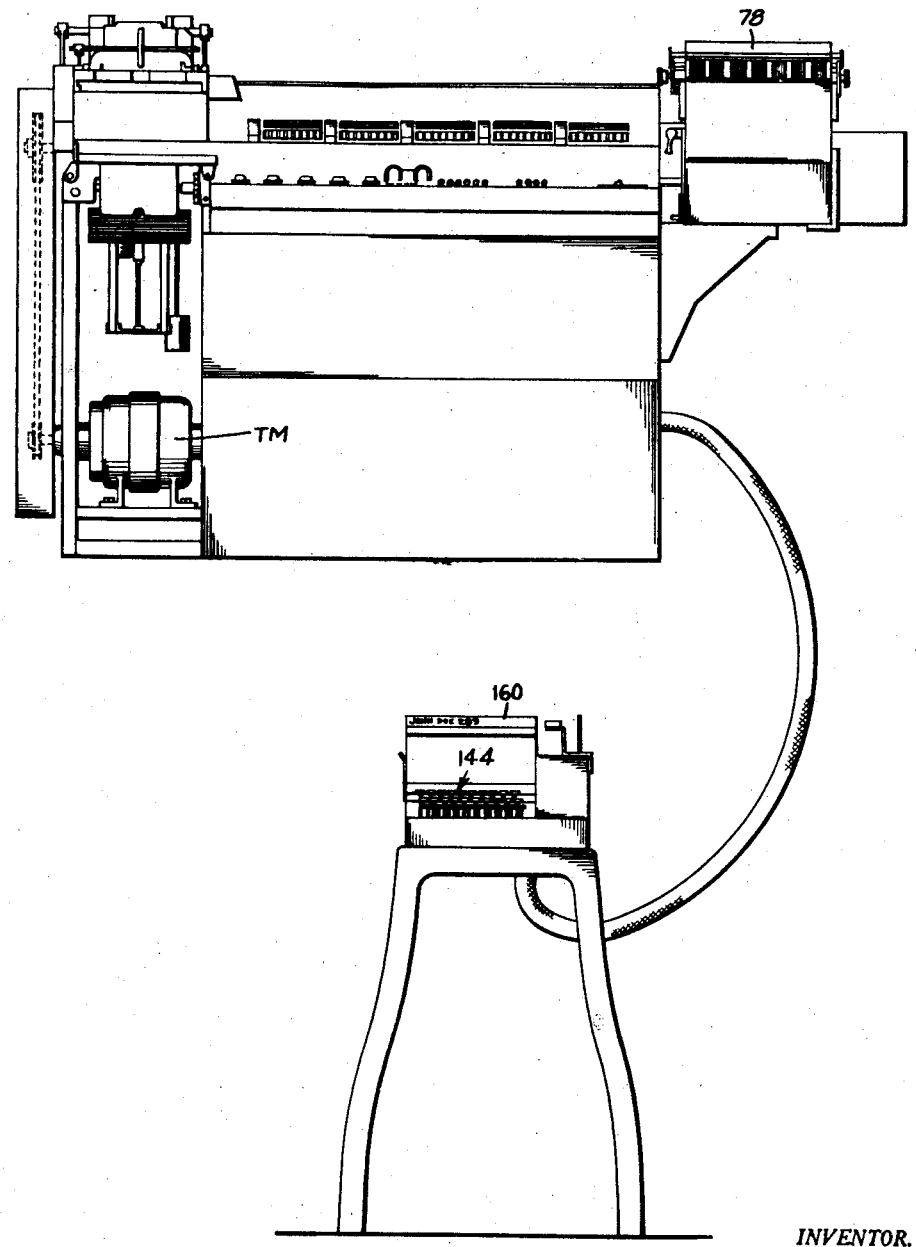
Fig. 1 is a view in front elevation disclosing an interconnected tabulating machine and a ledger card selecting machine whereby the operation of the tabulating machine selects ledger cards from the file.

In Fig. 2, reference character 165 designates as in said patent the listing shaft of the machine which is driven by the tabulating motor TM (Fig. 1) when the machine is adjusted to perform listing operations. To the shaft 165 there is secured a listing box cam 61. The cam slot in the box cam is adapted to cooperate with a roller 62. The printing crosshead 63 is mounted for vertical reciprocation on guide rods 64 and is connected by links 65 to arms 66 which are secured to a shaft 67. Shaft 67 has secured thereto a double arm member 68, one arm of which has a mechanical cooperation with a cam follower arm 69 which carries the roller 62. By virtue of this construction, it is apparent that rotation of shaft 165 will reciprocate the crosshead 63 and thereby reciprocate type bars 70 which are carried at the upper ends of type carrying bars 71. The type carrying bars 71 are slidably mounted in the crosshead 63. Their lower ends abut the free ends of arms 72 pivoted at 73 to the crosshead 63 and held in the position shown by springs 74. Thus upward movement of the crosshead 63 will be accompanied by movement in the same direction of the type bars 70 which are slidable horizontally in the type carrying bar 71. The type carrying bars 71 are provided with a plurality of ratchet teeth 76 which cooperate with stopping pawls 77 so that the type bars may be interrupted at various positions to present any of their type elements to the printing plate 78 for printing upon the ledger card 160 presented in cooperation therewith.

By virtue of the spring connection 74 the type carrying bars 71 may be interrupted without interfering with the upward movement of the crosshead 63 which has an invariable extent of reciprocation controlled by the listing cam. The stopping pawl 77 is normally held in an inoperative position by a spring-pressed pivoted latch 79 whose lower end is connected by a rod 80 to a bell crank 81 which is pivoted at 82 and whose arm constitutes the armature of a printing magnet 83. Energization of magnet 83 will rock bell crank member 82 in a counterclockwise direction, drawing rod 80 toward the right to unlatch the pawl 77 so that it may swing into engagement with teeth 76 and interrupt the further movement of the type bar 71. The energization of each of the magnets 83 (Fig. 8) is controlled by the related one of the lower brushes LB which, upon sensing the perforation in the tabulating card will complete the circuit to the magnet 83 and, due to the synchronization of the type bar travel with the passage of the card by the brushes, will present to printing position the type element corresponding to the controlling perforation.

By means of plug connections 85 (Fig. 8) the LB brushes of certain columns are shown by way of example as plug connected to correlated printing control magnets 83 of one of the printing banks.

*Printing hammers.*—The printing hammers 24 which are adapted to strike the ends of the type elements 70 to press them against a suitable inking ribbon and a ledger card 160 surrounding the platen 78, are of a type well known in the art and fully described in the aforementioned patent. It is only necessary for an understanding of the operation of the printing mechanism to know that after all the type carrying bars 71 have been differentially displaced and held in their differential positions the hammers 24 are released for operation to effect the desired printing impression.

*Automatic control mechanism.*—The automatic control device described in detail in the aforementioned patent is employed in connection with the present improvement to determine whether a pair of record cards analyzed concurrently during the same tabulating machine cycle is identical with respect to their group control numbers. This mechanism will now be explained in detail.

A number of double wound relay magnets are provided, each having a pick-up winding 88 and a holding winding 89. Windings 88 terminate in plug sockets 90 and 91 by means of which the pick-up windings may be plug connected in series with the upper brushes UB and the lower brushes LB. Since the index point positions of the card passing the lower brushes LB are analyzed concurrently with the analysis of the corresponding index point positions of the following card passing the upper brushes UB, perforations occurring in corresponding index positions of both cards will complete a circuit to the pick-up winding 88 at a time in the cycle of the operation of the machine corresponding to the location of the perforation.

*Control pick-up circuit.*—In view of the fact that a single double-wound relay magnet is provided for each card column, the pick-up circuit for only one column will be described, it being assumed that brushes UB and LB locate corresponding perforations of a pair of records at the same time. This circuit is traceable as follows: from line 34, cam contacts L—11, wire 92, upper brush contact roller 93, one of the upper brushes UB contacting with the roller 93 through a perforation in the record, plug socket 94, plug connection 95, socket 90, winding 88, socket 91, plug connection 96, socket 91a, to the brush LB of the corresponding column, through the perforation in the record at the lower brushes, lower brush contact roller 98, circuit breaking devices 99, lower card lever contacts 59, to the line side 35.

*Control holding circuit.*—The control holding circuit for a single order will now be explained. Energization of the winding 88 will close its contacts 88a and 88b, the former setting up a holding circuit for the winding 89 which is traceable as follows: from the line 34, wire 102, cam contacts L—12, contacts 88a (now closed), winding 89, wire 103 to the line side 35. Contacts L—12 hold the windings 89 energized until the end of the cycle and until the mechanism has performed its controlling function. It is thus apparent that the windings 88 are differentially energized in accordance with the value of the controlling perforation and that the windings 89 hold all the stick circuits to keep the contacts 88b closed in all orders in which agreement occurred between the cards.

Since two card columns are assumed to be devoted to represent group numbers only two of the six double-wound relay magnets 88—89 are shown plug connected to the corresponding card columns of both the upper brushes UB and the lower brushes LB in the wiring diagram in Fig. 8. Obviously, if there is an agreement in all card columns, the two sets of contacts 88b will be closed after all the index point positions have been analyzed. In the event that there is disagreement in a perforation position of compared card columns, the winding 88 of the corresponding column will not be energized and the corresponding set of contacts 88b will, therefore, be open after the analyzing of the numeral positions of the card has been completed.

Manual reset cycle

To effect the initial reset cycle previously mentioned the reset key controlled contacts R (Fig. 8) are closed to complete a circuit from the line 35, contacts L—2 now closed, wire 45, contacts 39b, contacts R, wire 47, a relay magnet 48, contacts P—3 to line 34.

The closure of contacts 48a will set up a holding circuit for magnet 48 from the line 34, contacts P—3, magnet 48, contacts 48a, to line 35. A circuit is also completed from line 35, contacts 48a, contacts L—4, now closed, reset clutch magnet 97, contacts 84c, contacts P—3 to line 34. This will permit a completion of the circuit through the reset motor RM from the line 34, motor RM, magnet 50, wire 51, contacts 87, wire 52 to line 35. The motor RM will thereupon operate to drive the resetting mechanism for a cycle of operation during which contacts P—4 close to short circuit the contacts 87 and maintain the circuit through motor RM and shortly thereafter contacts P—9 (Fig. 9) open to break the circuit through a magnet 84 (Fig. 9). This magnet was energized during the manual reset cycle by a circuit extending from line 34 (Fig. 9), magnet 84, relay contacts 38c, relay contacts 48b, cam contacts P—9, wire 54, card lever contacts 59 to line 35. The contacts 38a are controlled by the motor control magnet 38 and are opened when magnet 38 is deenergized due to a change in group control number in a manner to be explained.

Magnet 38 is normally held energized through a circuit setup during the initial reset cycle of the machine. During this cycle cam contacts P7, P8 (Fig. 8) close at the same time. The circuit will be completed from the line 34, contacts P—7, switch 15, contacts P—8, control relay magnet 16, magnet 17, wire 18, motor control relay magnet 38, wire 19, cam contacts L—10, L—9, wire 103 to the right side of line 35. Relay magnet 16 closes its relay contacts 16a to establish a holding circuit from the line 34, contacts 16a, magnet 16 to line 35. This circuit remains closed as long as the group control numbers on the card do not change, it now being obvious that relay magnet 38 remains energized until the change in group control number occurs.

During the listing cycles the relay contacts 88b provide a shunt circuit around cam contacts L—10 and L—9. For example, this shunt circuit comprises all the five relay contacts 88b used for controlling and short circuits both contacts L—10 and L—9 the short circuit extending from the lower blade of contacts L—10 serially through the five selected contacts 88b in accordance with the example selected, plug connection 121, plug socket 115, relay contacts $UCL_e$ which are closed while cards are passing the upper brushes to wire 103, and to line 35. Thus if at the time contacts L—9 and L—10 open and the control relays have registered agreement between the two cards analyzed, the holding circuit will be sustained through the contacts 88b. If at such time any of the contacts 88b had failed to close, the holding circuit would have failed to remain closed and the control relay magnets 16 and 17 would also have been deenergized as well as the motor control relay 38 causing the stoppage of the machine for a subsequent manually controlled total taking and reset operation.

*Analyzing of designations for ledger card selection*

Certain card columns of the tabulating card are appropriated for receiving designations for causing the selection of the ledger cards and these designations may be the same as the designations representing the group number. That is the group control number may correspond with the ledger card number. If so desired, the upper brushes UB analyzing the group control designations may be plugged by plug connections to sockets 94 to control ledger card selection but as shown in Fig. 9 certain other of the brushes UB are shown for convenience as having plug connections 125 to sockets 126.

Figure 6:
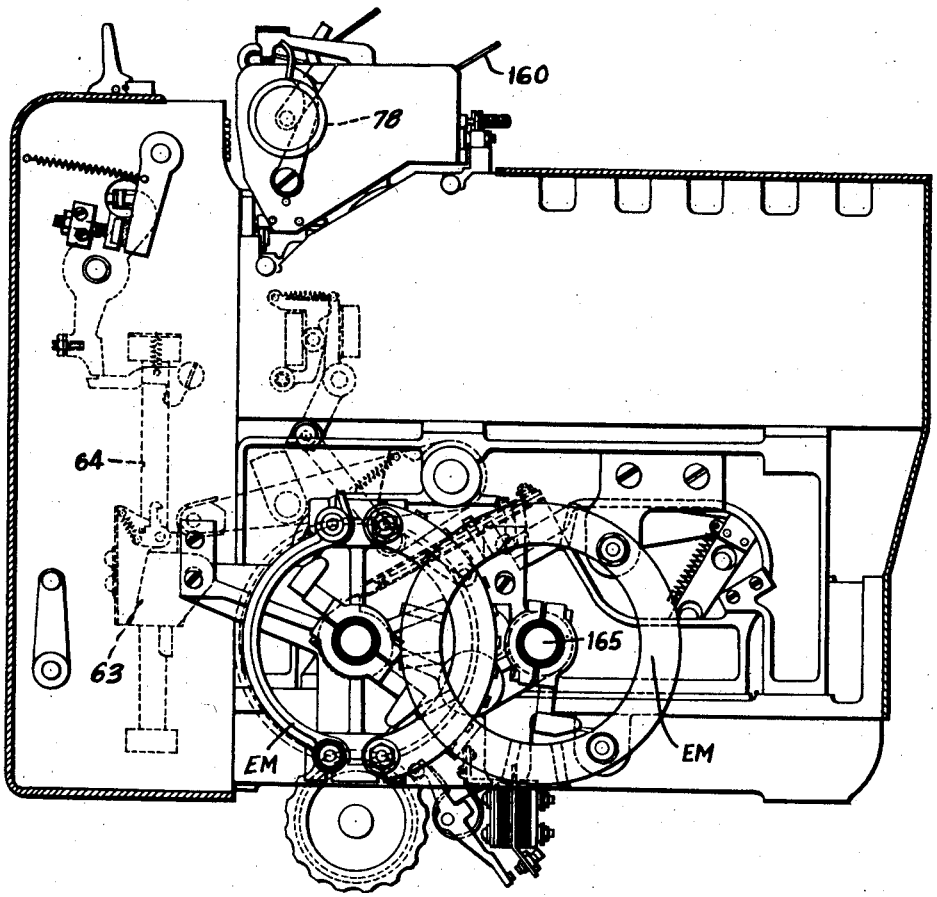
Fig. 6 is an end view of the printing mechanism shown in Fig. 2.

As best shown in Fig. 8, the circuit to the upper brushes UB extends from the line side 34, through cam contacts L—11 to wire 92, to the contact roller 93 and as shown in Fig. 9, for the contact roller 93 therein the circuit then extends by the brushes analyzing the designations for ledger card selection to the plug connections 125 to sockets 126. From each socket 126 the circuit is completed to a selected relay magnet 127 through an emitter $Em$. There are three emitters $Em$ one for the units order, one for the tens and one for the hundreds order and the rotating brush assembly of each is driven by the listing shaft 165 (see Fig. 6) and which corresponds to the same designated shaft in Patent No. 1,976,617. The brush assembly rotates synchronously with the passage of the card past the upper brushes and since at this time cam contacts L—11 are closed the circuit to a selected relay magnet 127 will be closed, since each set of relay magnets 127 for each order has a common wire connection 128 to the other line side 35. Each relay magnet 127 when energized closes its stick relay contacts 127a, said stick contacts for each order having a common wire connection 129 to cam contacts L—34 which are connected by a wire 130 to the line side 34.

As best shown in Fig. 9 the selected relay magnet 127 will close its relay contacts 127b thereby completing at this point a circuit to a ledger card selecting magnet, numeral 130 designating those of the units order, 131 of the tens order and 132 of the hundreds order. All of these sets of magnets have a common wire connection 133 to the line side 34 and the sets of relay contacts 127b have a common wire connection 134 to relay contacts 135a, which are connected to the line side 35. While each card passing the upper brushes causes the energization of the selected relay magnets 127, the energization of the ledger card selecting magnets 130, 131 and 132 is dependent upon the closure of relay contacts 135a, and the time that the magnet 135 will be energized to close these relay contacts 135a will now be explained.

The circuit for magnet 135 is shown at the top of Fig. 9 and extends from the line side 34, through a switch 136, to magnet 135, through relay contacts 38g, card lever contacts $UCL_m$, cam contacts L—32 and by a wire 137 to the line side 35.

During the initial and each reset operation the magnet 38 will be energized to open the relay contacts 38g so as to open the circuit to the magnet 135 at this point. During the first card feeding cycle the relay magnet 38 will not be energized so that relay contacts 38g will be closed at the time cam contacts L—32 close. However, the upper card lever contacts 58 close after cam contacts L—32 open so that while card lever contacts $UCL_m$ have closed, contacts L—32 have previously opened. Thereafter cards are presented to both the upper and lower sets of brushes, each card passing the lower brushes causing the printing of the items represented by the cards on the ledger card previously presented to the platen. At some time a card having a different group control number will be presented to the upper brushes and the auto control mechanism will now function.

It will be recalled that during the cycle of machine operation in which a change in group control numbers was detected that the motor control relay magnet 38 is deenergized thereby permitting its contacts 38g to close, and since there is a card at the upper brushes UB contacts $UCL_m$ will be closed and when contacts L—32 close the magnet 135 will be energized. The latter closes its contacts 135a to cause the energization of the magnets 130, 131 and 132 selected according to the relay contacts 127b previously closed.

The manner in which the ledger selecting magnets cause the selection of the desired ledger card will now be explained.

*Ledger card selecting machine*

Figure 3:
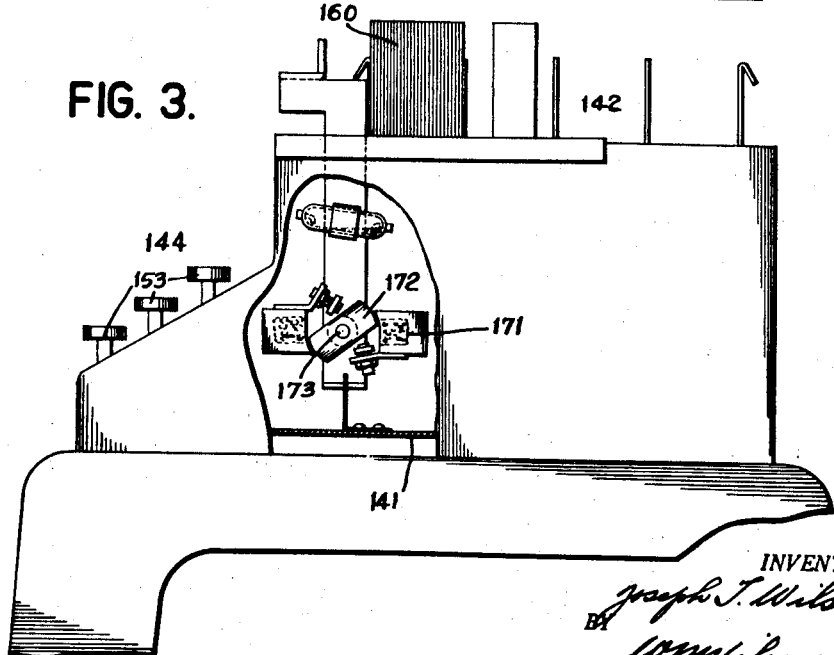
Fig. 3 is an end view of the ledger card filing and selecting machine.

The ledger card selecting machine adapted to be employed in connection with the present invention is preferably of the type shown in the patents to J. W. Whitson Nos. 2,002,807 and 2,002,808 and is disclosed in Figs. 1 (at the bottom) and in Figs. 3, 4, and 5, the last three mentioned figures being substantial copies of Figs. 6, 2 and 3, respectively, of Patent No. 2,002,808.

Since this machine is fully disclosed in the Patent No. 2,002,808 it is only generally described herein but in sufficient detail to understand its cooperation with and control by the tabulating machine.

The machine illustrated in the patent comprises a card compartment 142 (Fig. 4), a mechanism compartment 143, and a keyboard 144. The casing 141 is provided with supporting frames 145 (Fig. 5) each of which has a shoulder 146 on its top edge at respectively opposite sides thereof, the upper edges forming the bottom supporting surface of the compartment 142 so that the bottom edges of the ledger cards 160 at opposite ends rest upon the shoulders 146. A plurality of holders 147 are arranged laterally across the casing 141 between the front, center, and rear ends thereof and each is provided with a series of slots 148 (Fig. 4) cut down from the upper edge thereof and extending across the entire length of said cross members. The slots 148 in all the holders 147 are in alignment with each other. The lower edge of each of the holders 147 is turned up in a U-section so that the edge 149 is bent upwardly to be on a plane substantially flush with the bottom of slots 148.

A selector bar 150 is confined in each of the slots 148 in each of the cross members 147, each of said selector bars 150 extending from a point rearwardly of the rearmost holder 147 to a point forward of the foremost holder 147. The upper edge of each of the selector bars 150 lies substantially flush with the upper edge of the holder 147. Each of the selector bars 150 has inclined slots 151 formed therein through which rods 152 extend, said rods being attached at their opposite ends to opposite sides of the inside supporting frames 145.

A plurality of finger keys 153 comprising the keyboard 144 are mounted on levers 155 which in turn are rotatively journaled on a cross-bar 156. Each of the key levers 155 engages one of the selector bars 150 beyond the fulcrum bar 156. Thus when any one of the finger keys 153 is depressed, the opposite end of the key lever is moved upwardly causing a corresponding upward and forward movement of the related selector bar 150 within the limits of movement prescribed by the inclined slots 151 and cross rods 152. Each lever 155 on opposite sides of the pivotal axis 156 is confined in the respective guide members 157 and 158 which are substantially the same as holders 147 but in the inverted position, to eliminate lateral play of said levers during movement thereof.

The ledger cards 160 are provided with a plurality of spaced lugs or abutments 159 (Fig. 5) along the bottom edge thereof, the spaces between the plurality of lugs corresponding to the number of selector bars 150. Each one of the lugs or the space between any pair of lugs may represent or be designated by any of the numbers or by any other emblems or indicia to suit the particular conditions of work of the card. The lugs or spaces on the bottom of the card are related to the finger keys on the machine whereby each key on the keyboard when depressed will always move its selector bar into a space on the bottom of the card having a symbol corresponding with that on the key. Fig. 5 shows a card 160 after some of the lugs 159 have been removed. The card can be made of magnetically attractive material or as shown in Fig. 5, light spring-steel pieces 161 may be attached to the card edge in some conventional manner. The cards must be responsive to magnetic attraction and suitable magnetically attractable material may either be incorporated in the card or attached thereto.

*Operation*

In order to cause the card 160 shown in Fig. 5 to be selected from a group of cards confined in the card compartment, the tabulating machine will cause certain levers 155 to be depressed corresponding to the name, number, or title or other "key" data which will distinguish that particular card from other cards.

The card 160 from which certain of the lugs have been cut, as shown in Fig. 5, is in the card compartment 142. In order to select the card shown in Fig. 5 with the cut-out portions thereof from the stack of cards, all of the cards in the holder have at the start the left marginal edges thereof in alignment. This would be done manually by forcing the cards against the side wall 162 (Fig. 5) of the casing 142.

An electromagnet 163 of any suitable form, size and type is arranged lengthwise of the casing 141 along the side thereof opposite the adjustable wall 162. The magnet extends the full length of the casing 141. By means explained in Patent No. 2,002,808 the magnet 163 is maintained in the desired position relative to the side of the card compartment. The side of the magnet facing the edges of the ledger cards stacked in the card compartment is inclined at an angle to said cards whereby when any ledger card or ledger cards are attracted to the magnet, said card is caused to move horizontally and then upwardly on an arc as it is withdrawn from the stack of ledger cards, as shown by dotted lines in Fig. 5. The angle of inclination of the magnet relative to the card edges may be adjusted at will through the instrumentality of means fully explained in Patent No. 2,002,808.

In order to attract the card with the cut-out portions shown in Fig. 5 from the stack of cards, the tabulating machine causes certain levers 155 to be rocked and corresponding to the symbols represented by the cut-out portions on said card. The levers 155 when rocked force the selector bars 150 upwardly into the cut-out spaces between the lugs on said card. The selector bars would also assume a position in the spaces between the lugs on all other cards in the stack which either have or do not have cut-out portions thereon. Obviously cards that do not have lugs cut from the bottom edge thereof could not have any lateral movement inasmuch as the width of the selector bar exactly fits the space between any pair of lugs. However, for those cards where one or more lugs have been removed to provide a space between lugs greater than the width or thickness of the selector bar then such card can move laterally relative to the selector bars extended between the lug spaces thereon. After the desired selector bars have engaged with the aforesaid selector spaces on the bottom of the cards the tabulating machine operates means to close a circuit from a source of electricity to the magnet 163 to energize the magnet with electricity and to thereby magnetically attract toward the magnet one or more selected cards. When the cards 160 are in the card compartment in the position to be selectably attracted to the magnet, the opposite edges of said cards are supported on the shoulders 146 (Fig. 5) in the bottom of the card compartment and hence are free to move laterally with a minimum of resistance. After the selected cards have been attracted to the magnet 163 the operator would withdraw said selected cards from the stack of cards. Means is then operated to return the selector bars 150 to a position in readiness for repeating the selecting operation, and such return movement of the selector bars causes the levers 155 to be reversely rocked to the operating position.

Referring to Fig. 9 and recalling that the selected control magnets 130, 131 and 132 are energized upon a change in group control it will be seen from Fig. 4 that each of these magnets is adapted to withdraw its core 167 to rock an arm 168 which draws a pitman 169 downwardly. The latter carries a pin 169 fitting in a slot 170 of a related lever 155 to thus operate the same just as if a key 153 was depressed. Obviously a magnet is provided for each of the key levers 155.

Figure 7:
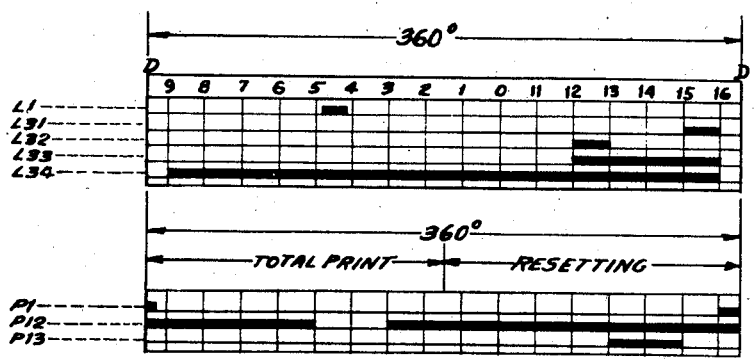
Fig. 7 is a diagram showing the timing of cam controlled electrical contacts involved in the present invention.

From the timing diagram of Fig. 7 it will be seen that cam contacts L—32 close when cam contacts L—33 close and the latter remain closed for some time after contacts L—32 open. Cam contacts L—33 in conjunction with relay contacts 135b provide a shunt circuit across (Fig. 9) relay contacts 38g, UCIm, and contacts L—32 to thereby retain the magnets 130, 131, 132 energized until cam contacts L—33 open.

The circuit for the card selecting magnet 163 extends from the line side 34, through switch 136, to the magnet 163, to cam contacts L—31 and relay contacts 135c to the line side 35. From Fig. 7 it will be seen that cam contacts L—31 close prior to the time contacts L—33 open so that since the latter are closed to retain the selected magnets 130, 131, 132 energized when cam contacts L—31 close to cause the energization of the card pulling magnet 163 the selector bars 150 will be held in their raised position so as to select the desired ledger card.

The machine stops at the end of the last item printing operation for a group and in order to retain the selected ledger card elevated as shown in Fig. 5 there is preferably provided a stick circuit for the magnet 163 (Fig. 9) extending through its relay contacts 163a, cam contacts P—12 now closed, to the line side 35.

The next machine operation is manually initiated total taking and reset operation which preferably prints the total by means fully explained and disclosed in the aforementioned Patent No. 1,976,617 upon the ledger card upon which the items or amounts pertaining to the group have been printed. The printing mechanism is, of course, provided with a line spacing mechanism for spacing the items and totals of a form well known in the art and fully described in the Patent No. 1,976,617. The completely printed ledger card is now withdrawn and the next ledger card which has been selected is withdrawn from the file after the total taking and reset operation.

The cam contacts P—12 open during the total taking and reset operation to open the circuit through the stick contacts 163a and thus deenergize magnet 163. While the latter no longer attracts the steel piece 161 attached to the selected ledger card the latter will by friction between it and adjacent ledger cards remain in shifted position. This selected ledger card corresponds to the next group of tabulating cards and is presented to the platen before the tabulating operations are resumed.

During the total taking and reset operation cam contacts P—13 close to energize a magnet 171, the latter being in series with cam contacts P—13 and lower card lever contacts LCLm and across the line wires 34, 35. When the magnet 171 is energized it will rotate its armature 172 (Fig. 3) and a shaft 173 attached thereto. The shaft 173, as described in Patent No. 2,002,808 is provided with a bar 174 (Fig. 4) extending transversely and adapted to engage the forward ends of the selector bars 150 and move said bars downwardly and rearwardly to restore the selector bars to a position in readiness for repeating the selecting operations, and such return movement of the selector bars causes the levers 155 to be raised to the operating position.

The operation of the machine may now be resumed and by depressing the start key ST tabulating operations in connection with the next group of cards is effected.

It will be observed that if the last group contains but a single card it will cause the automatic selection of a correlated ledger card by reason of the fact that cam contacts L—32 close before the passage of the card at the upper brushes passes card lever 58 to deenergize magnet UCL and open its relay contacts UCIm. Hence the circuit to magnet 135 will be closed, as previously described, and the selected magnets 130, 131, and 132 will be energized to select a ledger card appropriate to the card of the last group, even if it comprises a single card.

Also in starting up operations the proper ledger card is selected as follows: During the first card analyzing cycle as the first card traverses the upper brushes UB there is no energization of magnets 88 because the circuit to the lower brush contact roll 98 is open through the lower card lever contacts 59. Accordingly, when cam contacts L—10 open, the relay 38 becomes deenergized and contacts 38g reclose. A pick-up circuit for magnet 135 is then completed upon closure of cam contacts L—32, UCLm contacts now being closed. In the previously described manner relay contacts 135a close to cause the selected relays 127 to cause the selection of the related magnets 130—132. Subsequent operations then follow exactly as before.

While the term "ledger card" is employed herein it is the desire to define this term in a generic sense since it may be an equivalent article such as a perforated record, a bill, a paper strip, etc.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a tabulating machine controlled by tabulating cards having various classifications occurring in or out of sequence, means controlled by the tabulating cards for printing classified items represented thereby upon a ledger card similarly classified, and means dependent upon a change in classification of the items for selecting out of a file of ledger cards a ledger card having a classification appropriate to the items of the next classification.

2. In a tabulating machine controlled by classified groups of tabulating cards, a printing mechanism controlled thereby for printing items upon a classified record selected from a file of classified records, and means controlled by said groups of tabulating cards and responsive to a change in group classifications for selecting said records of classifications which agree with the classifications of the groups of tabulating cards.

3. In an automatically controlled tabulating machine controlled by successive groups of classified tabulating cards arranged in a promiscuous sequence, means for printing the data on a group of tabulating cards on a classified record, means for automatically continuing the printing operations on the record as long as the classification of tabulating cards does not change, means for selecting said classified records out of a file, and means dependent upon a change in classification of the tabulating cards for automatically causing said selecting means to select a record card having a classification which is in agreement with the classification of the next group of tabulating cards.

4. In a tabulating machine controlled by classified groups of tabulating cards occurring in a promiscuous sequence, a file of ledger cards, means controlled by said tabulating cards for printing data designated thereon on a selected ledger card, means for selecting the ledger cards out of a file, means dependent upon a change in classification of the tabulating cards for inhibiting further operations of said printing means, and means dependent upon a change in classification of the tabulating cards for causing said selecting means to select a ledger card correlated with the next group of tabulating cards.

5. A machine of the class described controlled by a plurality of differently classified means each for representing an item and the classification of the item, means controlled by said representing means for printing the item upon a classified record which is selected according to the classification of the item from a file of said classified records, and means responsive to the change in classification of said first-named means for selecting out of the file of said records a single record having a classification in agreement with the classification of the item to be printed thereon.

6. In a tabulating machine controlled by differently classified groups of tabulating cards, a printing mechanism for printing data represented by the groups of tabulating cards, a series of classified ledger cards arranged in a file each of which is manually presented to the printing mechanism for receiving data printed under control of a correlated group of tabulating cards, selecting means for said ledger cards, and means controlled by said tabulating cards and responsive to a change in classification of the groups for picking out of the file a single ledger card having a classification correlated with the next group for its subsequent manual presentation to said printing mechanism.

7. A tabulating machine controlled by classified groups of tabulating cards and including therein a tabulating card controlled printing mechanism for printing upon records and a group control means for sensing a change in classification of the groups of tabulating cards, a separate machine including a classified file of said records, and interconnecting means between said machine including record selecting means in said separate machine and responsive to a change in the classification of groups of tabulating cards in the tabulating machine for selecting a single record from said file having a classification related to the classification of a group of tabulating cards.

JOSEPH T. WILSON.